United States Patent
Takemoto (10) Patent No.: US 10,477,440 B2
(45) Date of Patent: Nov. 12, 2019

(54) CONTENT RECEIVING APPARATUS AND METHOD FOR CHANGING CONNECTION OF CONTENT RECEIVING APPARATUS

(71) Applicant: Funai Electric Co., Ltd., Osaka (JP)

(72) Inventor: Makoto Takemoto, Shijonawate (JP)

(73) Assignee: Funai Electric Co., Ltd., Osaka (JP)

( * ) Notice: Subject to any disclaimer, the term of this patent is extended or adjusted under 35 U.S.C. 154(b) by 445 days.

(21) Appl. No.: 15/228,721

(22) Filed: Aug. 4, 2016

(65) Prior Publication Data

US 2017/0041835 A1 Feb. 9, 2017

(30) Foreign Application Priority Data

Aug. 6, 2015 (JP) ................. 2015-156463

(51) Int. Cl.
| | |
|---|---|
| H04W 36/00 | (2009.01) |
| H04W 36/14 | (2009.01) |
| H04W 36/26 | (2009.01) |
| H04L 29/06 | (2006.01) |
| H04W 36/02 | (2009.01) |
| H04W 84/12 | (2009.01) |
| H04W 84/04 | (2009.01) |

(52) U.S. Cl.
CPC ..... *H04W 36/0033* (2013.01); *H04L 65/4076* (2013.01); *H04L 65/4084* (2013.01); *H04L 65/80* (2013.01); *H04W 36/023* (2013.01); *H04W 36/14* (2013.01); *H04W 36/26* (2013.01); *H04W 84/042* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 9,014,136 | B2 * | 4/2015 | Roeder | H04W 36/0033 370/331 |
| 2003/0005040 | A1 * | 1/2003 | Kukkal | H04L 29/06027 709/203 |

(Continued)

FOREIGN PATENT DOCUMENTS

| | | |
|---|---|---|
| CN | 101227745 A | 7/2008 |
| CN | 101861751 A | 10/2010 |

(Continued)

OTHER PUBLICATIONS

Extended European Search Report issued in corresponding European Patent Application Na 16183103.7 dated Jan. 18, 2017 (11 pages).

(Continued)

*Primary Examiner* — Scott B Christensen
(74) *Attorney, Agent, or Firm* — Osha Liang LLP (57) ABSTRACT

A content receiving apparatus that connects to a first network and one or more access points of a second network includes a communication unit that receives a content distributed from an external apparatus, a memory that stores a first access point of the second network that meets a predetermined first condition, a detector that detects a first access point connectable to the content receiving apparatus of the second network in the memory; and a controller that changes a connection to the detected first access point if a predetermined second condition is met while the content is being played.

18 Claims, 9 Drawing Sheets

(56) References Cited

U.S. PATENT DOCUMENTS

| | | | |
|---|---|---|---|
| 2004/0243715 A1* | 12/2004 | Yokoyama | H04L 29/06 709/231 |
| 2004/0255063 A1* | 12/2004 | Crinon | H04N 21/23406 710/55 |
| 2005/0226198 A1* | 10/2005 | Barak | H04B 7/265 370/345 |
| 2006/0048202 A1* | 3/2006 | Bontempi | H04L 12/2801 725/118 |
| 2007/0066304 A1* | 3/2007 | Lee | H04W 48/20 455/436 |
| 2008/0037473 A1* | 2/2008 | Brown | H04W 76/15 370/332 |
| 2008/0069065 A1* | 3/2008 | Wu | H04W 36/08 370/340 |
| 2009/0137249 A1* | 5/2009 | Horn | H04W 36/0083 455/435.2 |
| 2009/0285175 A1* | 11/2009 | Nix | H04L 29/125 370/331 |
| 2010/0169504 A1* | 7/2010 | Gabin | H04L 65/4076 709/231 |
| 2010/0296476 A1* | 11/2010 | Li | H04H 20/26 370/329 |
| 2012/0315889 A1* | 12/2012 | Ionescu | H04W 8/183 455/422.1 |
| 2013/0238751 A1* | 9/2013 | Raleigh | H04L 67/20 709/217 |
| 2014/0192642 A1* | 7/2014 | Medapalli | H04W 48/18 370/230 |
| 2015/0106312 A1* | 4/2015 | Chen | H04W 4/028 706/21 |
| 2016/0065995 A1* | 3/2016 | Phillips | H04N 21/238 725/62 |
| 2016/0381606 A1* | 12/2016 | Lou | H04W 36/0066 370/331 |

FOREIGN PATENT DOCUMENTS

| | | |
|---|---|---|
| JP | 2003-110751 A | 4/2003 |
| JP | 2004-356922 A | 12/2004 |

OTHER PUBLICATIONS

Office Action issued in corresponding Chinese Application No. 201610638013.0, dated Sep. 27, 2018 (19 pages).

* cited by examiner

CONTENT RECEIVING APPARATUS AND METHOD FOR CHANGING CONNECTION OF CONTENT RECEIVING APPARATUS

TECHNICAL FIELD

The present invention generally relates to a content receiving apparatus and a method for changing a connection of the content receiving apparatus.

BACKGROUND

A mobile terminal is connected from outside a home to a content server in the home, making it possible for the content to be received. When outside the home, the mobile terminal is connected to a network by a wireless WAN (Wide Area Network) environment, and, upon returning home, when it discovers an access point of a wireless LAN environment in the home, it connects to that same wireless LAN (Local Area Network) environment and continues to receive a distribution of content.

At this time, when the access point of a connectable LAN is detected, the mobile terminal automatically switches from the wireless WAN to the wireless LAN for the object of preventing billing, or for the object of fast data transfer rates, or the like. If present, a 3G/LTE network is common as the wireless WAN.

Patent literature 1 discloses a technique for switching so that one of either a wireless telephone line or a wireless LAN line is selectively used depending on the type of content.

Patent literature 2 discloses a technique for continuous viewing by buffering the content when switching communication networks.

CITATION LIST

Patent Literature

[Patent Literature 1] Japanese Patent Application Publication No. 2003-110751
[Patent Literature 2] Japanese Patent Application Publication No. 2004-356922

When viewing the content on a network with a mobile terminal, it is possible to return home while viewing by mobile radio waves that are a wireless WAN outside the home. When returned home, the mobile terminal will connect to an access point of a wireless LAN in the home, and by switching networks, the viewing program is interrupted because the reading of data becomes stagnant. In addition, when the mobile terminal can connect to a public wireless LAN, although it is connecting to the same public wireless LAN, in some cases, video playback and the like is not possible due to inherent limitations of the network in a public wireless LAN as such. Even when buffering the content, it cannot ensure that playback is uninterrupted, and it is a nuisance that the viewing of the content is interrupted.

SUMMARY OF THE INVENTION

According to one or more embodiments of the present invention, it is possible to reduce the displeasure when transitioning networks.

According to one or more embodiments of the present invention, a content receiving apparatus receiving a distribution of content from a content server, comprises a communication unit that can connect to a first wireless network and a second wireless network, wherein the device is configured to include: a memory for storing an access point of the second wireless network matching a predetermined first condition, a detector for detecting that it can connect to another access point of the second wireless network stored in the memory while connected to the first wireless network or the second wireless network, and a controller for switching to the detected access point of the second network when a predetermined second condition has been met during reception of the content.

In this configuration, the present content receiving apparatus can connect to the first wireless network and the second wireless network using the communication unit, and receives a distribution of content from the content server while connected to either of the networks. In addition, the storage portion stores the access point of the second wireless network matching the predetermined first condition, and the detector detects that it is able to connect to another access point of the second wireless network stored in the memory while connected to the first wireless network or the second wireless network.

Conventionally, when the mobile terminal detects that it is able to connect to another wireless LAN while connected to a wireless WAN or while connected to a wireless LAN, it switches from the wireless WAN connection to the wireless LAN. However, when the mobile terminal connects in that state, for example, the distribution during playback of the content may be interrupted.

However, even when detected by the detector that it is able to connect to an access point of the second wireless network while connected to the first wireless network, it does not immediately switch to the access point of the second wireless network. Also, once the predetermined second condition has been met, the controller switches to the access point of the detected second network.

For example, it is possible for the mobile terminal to stand-by for a timing in which it does not matter if it is interrupted during distribution of the content as the second condition. By standing-by for condition as such to be met, even if the distribution is interrupted while switching, no displeasure is felt while viewing.

A wireless WAN is applicable as a specific example of the first wireless network, and a wireless LAN is applicable as the second wireless network, but it is not limited to this.

According to one or more embodiments of the present invention, the controller may increase the buffer size of data received by the communication unit until the predetermined second condition has been met.

In this configuration, the controller increases the buffer size of data received by the communication unit until the predetermined second condition has been met. Since the buffer size is increased, data ahead of the current playback timing is accumulated in the buffer size.

According to one or more embodiments of the present invention, the controller may be configured so that the predetermined second condition is met upon detecting the timing of an advertisement in the content.

In this configuration, when the timing of an advertisement in the content is made to be the condition, it switches to the access point of the second wireless network detected by standing-by for the timing in which an advertisement has started in the content that is to be viewed naturally. Although the possibility that the transfer of data is interrupted is unavoidable when switching, even when the transfer is interrupted, the user does not feel any displeasure since it is during the viewing of an advertisement.

According to one or more embodiments of the present invention, the controller may be configured so that the predetermined second condition is met when a predetermined operation is carried out.

In this configuration, for example, when a predetermined operation is carried out, the controller determines that the predetermined second condition has been met, and switches from the first wireless network to the second wireless network.

While standing-by to switch from the first wireless network to the second wireless network, it is assumed that the user is carrying out a predetermined operation, for example, an operation other than playback of the content. Since an operation other than playback is being carried out, it does not mean that playback of the original content is being viewed. Therefore, even if the transfer is interrupted, since the content is not necessarily being viewed, the user does not feel any displeasure. In addition, even if the operation of the playback is carried out, since an interest in an operation other than viewing is increased, even if the transfer is interrupted, the user does not feel any displeasure since the content is not being viewed.

According to one or more embodiments of the present invention, the controller may be configured so that the predetermined second condition is met when the title of the content changes.

The title of the content being changed means that the playback of one content is expected to have finished. Therefore, if the distribution is temporarily interrupted with this timing, the user does not feel any displeasure since the content thus far has not been viewed.

In this configuration, when the title of the content changes, the controller determines that the predetermined second condition has been met when the title of the content is changed and switches to the access point of the detected second wireless network.

According to one or more embodiments of the present invention, a signal strength detector for detecting signal strength while connected to the second wireless network is included, and the controller may be configured to increases the buffer size of data received by the communication unit based on the detected signal strength.

In this configuration, the signal strength detector detects the signal strength while connected to the second wireless network. Also, the controller increases the buffer size of data received by the communication unit based on the signal strength detected by the signal strength detector.

For example, when detecting a reduction of signal strength in a wireless LAN while connected to the wireless LAN, the content receiving apparatus transitions, and is considered to be in a state departing from a region close to a wireless LAN. In this case, it is possible to increase the buffer size, and data ahead of the current playback timing is accumulated in the buffer size. Also, if departing from close to a wireless LAN and connecting to a wireless WAN, it is possible to be provided so that the content is interrupted as little as possible until connected to another wireless LAN.

Thus, according to one or more embodiments of the present invention, the content receiving apparatus stands-by for a timing in which playback of content may be interrupted, and it is permissible to switch from a wireless WAN to a wireless LAN at such a timing. In addition, the method according to one or more embodiments of the present invention is not necessarily limited to a tangible device, but that method can easily be understood to function as such. That is, it is not necessarily limited to a tangible device, and there is no difference in the effectiveness of that method.

Incidentally, such content receiving apparatus as this may exist as a stand-alone device or it may be used incorporated in a given piece of equipment, or the like. The concept of the present invention is not limited to this, but includes various aspects. Therefore, it can be appropriately changed to software, hardware, or a combination thereof.

For example, operations according to one or more embodiments may be realized as software of the content receiving apparatus or the storage medium that stores such software.

Furthermore, for example, one portion of operations according to one or more embodiments may be implemented as software and the other portion may be implemented as hardware.

Furthermore, one portion of the operations may be stored in the storage medium.

When implementing one or more embodiments of the present invention with software, it can be configured to use hardware or an operating system, or it can be implemented independent of these. For example, even with various calculation processes, the implementation method could be processing by calling a predetermined function in the operating system, or it could be receiving input from hardware without calling such a function. Also, in actuality, even if implemented under the intervention of an operating system, in a process in which the program is circulated by being stored on the medium, it can be understood that one or more embodiments of the present invention can be implemented using only this program.

According to one or more embodiments of the present invention, a content receiving apparatus that connects to a first network and one or more access points of a second network may comprise a communication unit that receives a content distributed from an external apparatus, a memory that stores a first access point of the second network that meets a predetermined first condition, a detector that detects a first access point connectable to the content receiving apparatus of the second network in the memory; and a controller that changes a connection to the detected first access point if a predetermined second condition is met while the content is being played.

According to one or more embodiments of the present invention, a method for changing a connection of a content receiving apparatus that connects to a first network and one or more access points of a second network may comprise receiving, with a communication unit of the content receiving apparatus, a content distributed from an external apparatus, storing, with a memory of a content receiving apparatus, a first access point of the second network that meets a predetermined first condition, detecting, with a detector of the content receiving apparatus, a first access point connectable to the content receiving apparatus of the second network in the memory, and changing, with a controller of the content receiving apparatus, the connection to the detected first access point if a predetermined second condition is met while the content is being played.

The content receiving apparatus according to one or more embodiments of the present invention can stand-by as a condition (predetermined second condition) to switch for a timing in which it does not matter if the distribution of content is interrupted, and by standing-by for such a condition to be met, even if the distribution is interrupted while switching, no displeasure is felt during the viewing.

DETAILED DESCRIPTION OF EMBODIMENTS

First Example

Embodiments of the present invention will be described below with reference to drawings.

Figure 1:
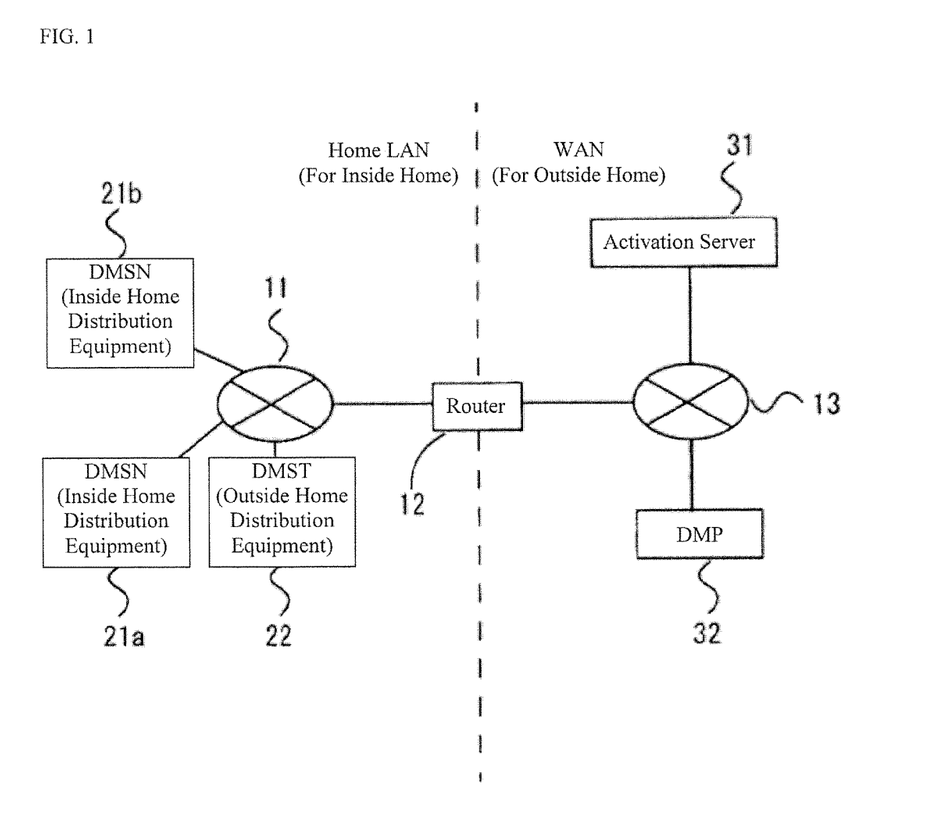
FIG. 1 is a network connection diagram of a DMS applying the content receiving apparatus according to one or more embodiments of the present invention.

FIG. 1 is a network connection diagram of a DMP that is the content receiving apparatus according to one or more embodiments of the present invention.

In FIG. 1, a LAN 11 is connected to an internet 13 via a router 12. The router 12 also serves as a gateway, and network equipment connected to the LAN 11 can connect with each network equipment connected to the internet 13 via the same router 12.

The LAN 11 is a relatively small-scale network within the home of a user or within a company. In one or more embodiments of the present invention, as an example, the LAN will be described as a home LAN set in the home of the user.

Recently, composite equipment is used that can receive, record or playback television broadcasting and satellite broadcasting. Generally, in addition to a tuner, a hard disk drive or a Blu-ray disk drive is included, and furthermore, the equipment is connected to a network, and data communication with other equipment is possible via the network. Due to data communication, a wide variety of viewing and the like such as distribution, dubbing, and playback of digital media is possible.

Equipment including an internal hard disk drive or a Blu-ray disk drive can also distribute digital media via the network, and are referred to as a digital media server (DMS). Even in a DMS, there are inside home distribution equipment DMSN 21a and DMSN 21b that can distribute only to network equipment connected to the same network, and outside home distribution equipment DMST22 that can distribute to network equipment connected to the internet 13 via the router 12. There is a wide variety of DMS, and such is not limited to the recording and playback equipment including a tuner as described above. In addition, the DMS often has a function as a DMP for receiving and playing back a distribution of content from another DMS.

Figure 2:
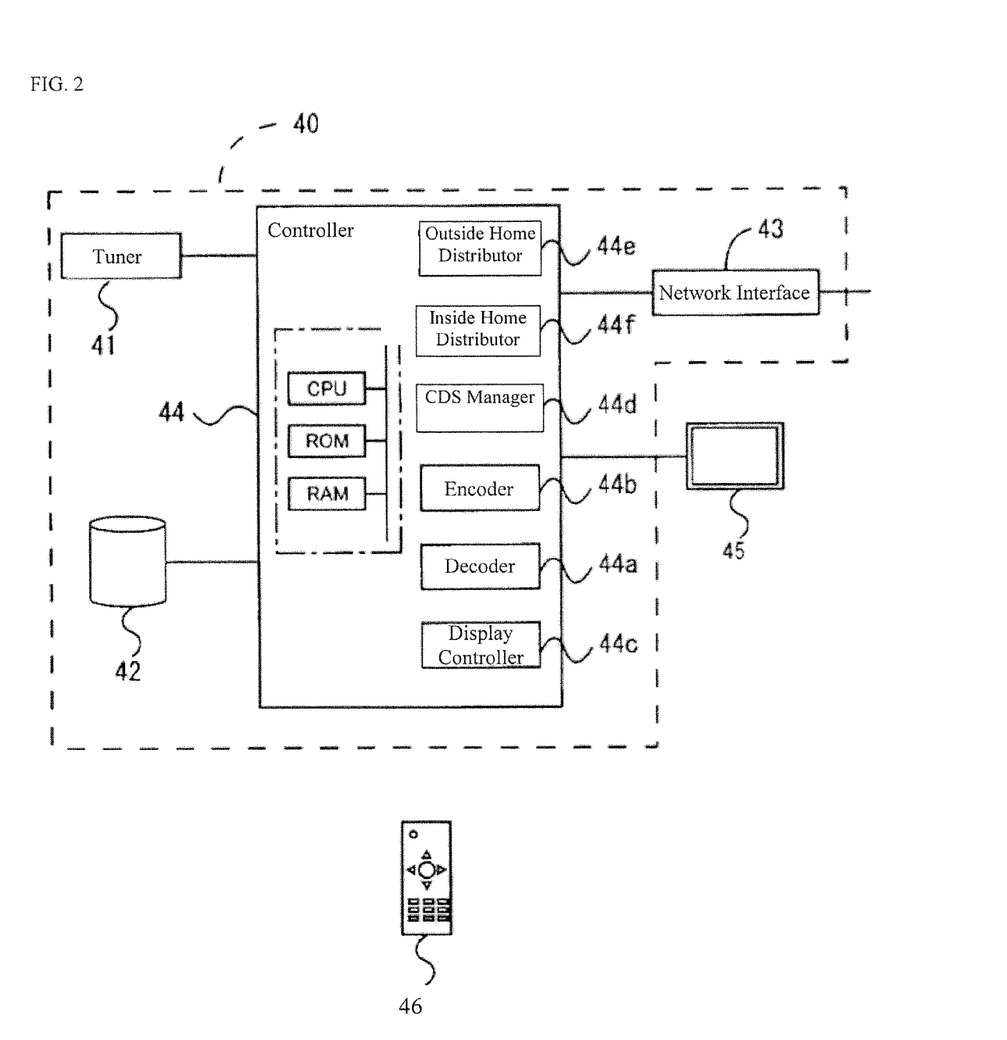
FIG. 2 is a schematic block diagram illustrating the DMS according to one or more embodiments of the present invention.

FIG. 2 is a schematic block diagram of the DMS according to one or more embodiments of the present invention.

DMS 40 includes a tuner 41 for receiving ground waves, television broadcasting such as satellite broadcast waves, radio broadcasting and data broadcasting; a hard disk drive 42 for storing and playing back digital data corresponding to the broadcast content; a network interface 43 to connect to the network; and a controller 44 for controlling these and outputting video and sound to an external display 45. The controller 44 includes a decoder 44a and encoder 44b used when carrying out storing and playback of digital data to the hard disk drive 42, a display controller 44c used in output of video and audio based on data, a CDS manager 44d for managing information stored to the hard disk drive 42, an outside home distribution equipment 44e and an inside home distribution portion 44f used when distributing content via the network interface, and the like.

Each function of the controller 44 is sometimes implemented by an independent unit configuration, but is often implemented by a CPU, including specialized LSI corresponding to each function, controlling these LSI. Thus, ROM and RAM or the like is included in order to implement the CPU and this program, and each function is implemented by hardware and software. In addition, a remote controller 46 is included, in which the user specifies the operation.

Normally, the network equipment connected to the internet 13 cannot confirm the address of the network equipment connected to the LAN 11. Thus, the outside home distribution equipment DMST 22 registers the information of the location in the activation server 31 connected to the internet 13, and the digital media player (DMP) 32 receiving distribution of digital media obtains predetermined information from the activation server 31. Using this information, the DMP 32 connected to the internet 13 can connect to network equipment connected to the LAN 11. A method for connecting from WAN to LAN via the activation server 31 can be a well-known method, and a detailed description will be omitted here.

The outside home distribution equipment DMST 22 and the inside home distribution equipment DMSN 21a and 21b record the broadcasted content received by the tuner as the content and, in addition to playing it back, distributes the same content via the network. The DMP on the side receiving the distribution searches for the information of the content being held for the outside home distribution equipment DMST 22 and requests distribution of specific content.

Figure 3:
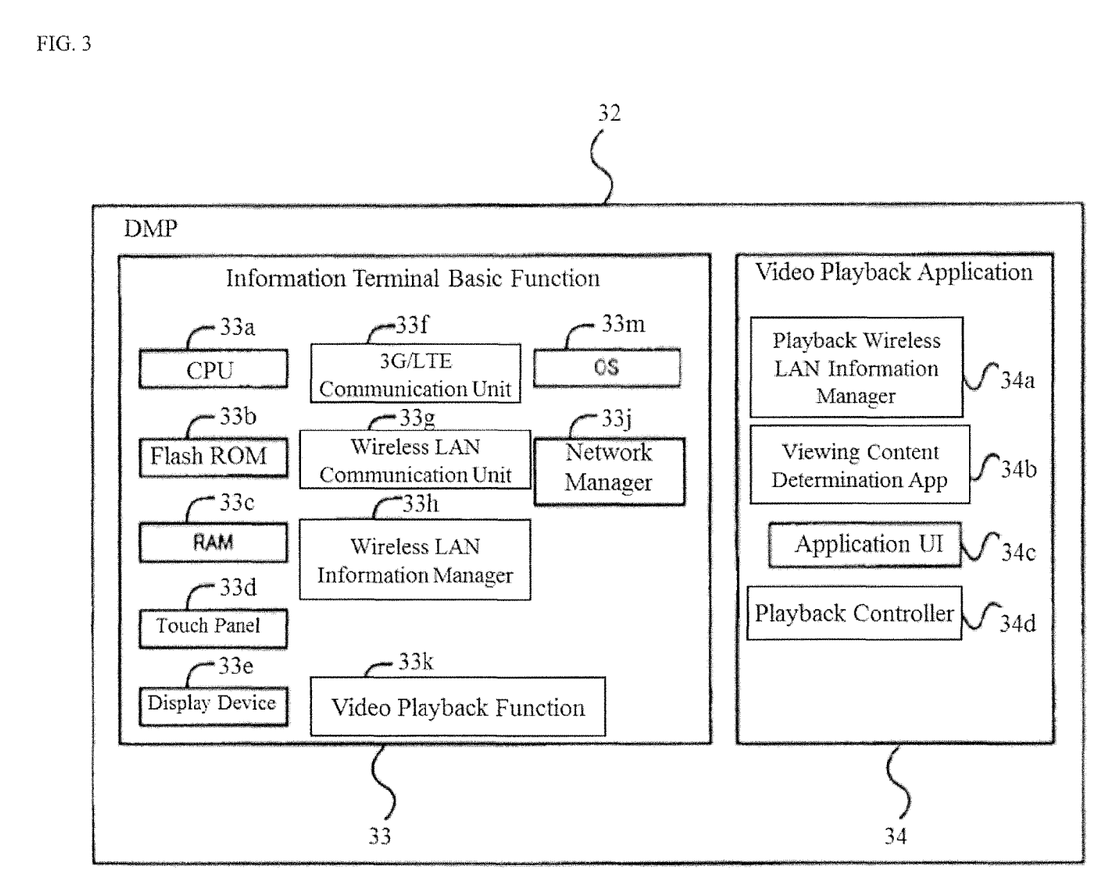
FIG. 3 is a block diagram illustrating a configuration of a DMP according to one or more embodiments of the present invention.

FIG. 3 is a block diagram illustrating a configuration of the DMP 32 that is the content receiving apparatus according to one or more embodiments of the present invention.

The DMP 32 in the present example is implemented as a mobile information terminal. The DMP 32 comprises an information terminal basic function 33 and a video playback application 34.

The information terminal basic function 33 includes a CPU 33a, a flash ROM 33b, and a RAM 33c, and the CPU 33a can execute a process for controlling each portion according to a predetermined program described later. The present DMP 32 includes a display device 33e and a touch panel 33d, and can be touch operated with the touch panel 33d while looking at the display of the display device 33e. In addition, a 3G/LTE communication unit 33f, a wireless LAN communication unit 33g, and a network manager 33j are included. A connection to a wireless WAN environment may be established using the 3G/LTE communication unit 33*f*, and a connection to a wireless LAN environment may be established using the wireless LAN communication unit 33*g*. Thus, a communication unit may comprise a 3G/LTE communication unit and a wireless LAN communication unit. For example, the 3G/LTE communication unit 33*f* and wireless LAN communication unit 33*g* may be implemented by a communication circuit, a controller, or a transceiver. The network manager 33*j* can implement detection of an access point of a wireless LAN such as is described later, and prohibition and release or the like for switching networks, and in addition stores information relating to the wireless LAN connection in a wireless LAN information manager 33*h*.

The DMP 32 includes an OS 33*m* that is the basis of the software, and further includes a video playback function 33*k* for assisting the video playback with hardware.

DMP 32 can implement the application software on the OS 33*m*, and the video playback application 34 can be executed as one of them. The video playback application 34 includes a playback wireless LAN information manager 34*a*, a viewing content determination application (app) (or determination circuit) 34*b*, an application UI 34*c*, and a playback control processing portion 34*d*. The playback wireless LAN information manager 34*a* stores the access point when content playback is stably carried out in a wireless LAN environment, the viewing content determination app 34*b* determines the nature of the content being played back at a certain point of time, such as whether the playback content when carrying out content playback is an advertisement, or whether it is at the timing in which the title has changed by recognizing the content of the title, or whether it is an opening portion among the content. The application UI 34*c* is a UI for inputting the operation in which the user of the DMP 32 uses playback outside a hall, in addition to playback operation, receives various input such as a fast forward instruction, a pause instruction, a fast rewind instruction, and a stop instruction, and carries out various displays such as the elapsed time during playback and the like. The playback control manager 34*d* plays back content based on data received as content, and carries out hardware decoding by controlling the video playback function 33*k*.

Figure 4:
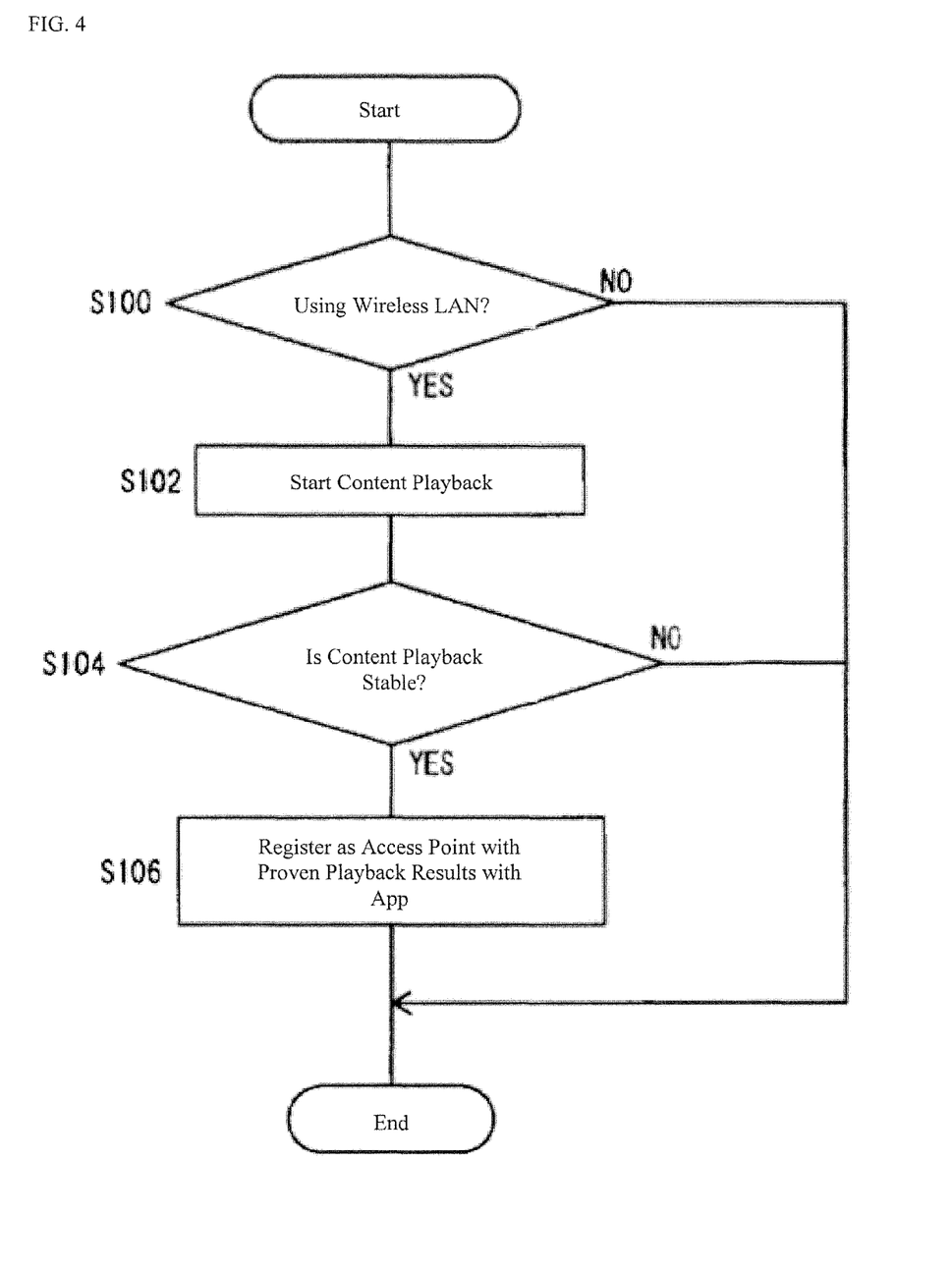
FIG. 4 is a flowchart for registering an access point with proven playback results according to one or more embodiments of a first example of the present invention.

FIG. 4 is a flowchart for registering an access point with proven playback results according to one or more embodiments of the present invention.

Start

When using outside the home distribution, the DMP 32 connects to the LAN 11 via the internet 13 in order to receive distribution of content. Thereafter, the CPU 33*a* of the DMP 32 determines that a wireless LAN is being used in step S100, starts playback of the content in step S102, and determines whether the content playback is being stably carried out in step S104. In the playback of the content, a list of content for the outside home distribution equipment DMST 22 is requested from the DMP 32, and after the content is determined based on that same list, distribution of that same content is requested from the DMP 32 to the outside home distribution equipment DMST 22. Then, the outside home distribution equipment DMST 22 transmits content data to the DMP 32 using a network established at that time. Whether the content can be stably played back primarily determines whether content data can be received to the extent that the playback will not be interrupted over a predetermined period. For example, it may be determined that it can stably be played back if the playback is uninterrupted for 180 seconds. Whether the playback is uninterrupted can be determined by the playback control manager 34*d* and the like. In step S100, the process for determining if a wireless LAN is being used is carried out, but when the playback of content is actually started, if a wireless LAN is being used, the process following step S104 may be executed.

Also, when it is determined that stable playback can be carried out, the CPU 33*a*, in step S106, registers the access point with a proven playback results with the app. Specifically, the CPU registers the SSID (corresponding to the individual identification information) of the access point in the playback wireless LAN information manager 34*a*. When connected with a wireless LAN, the SSID of the connected access point is managed by the wireless LAN information manager 33*h*. In addition, the process of steps S100 through S106 corresponds to the memory for storing the access point of the wireless LAN that conforms to the predetermined first condition.

Thereafter, each time the content playback is carried out in a new wireless LAN environment, the CPU 33*a* executes the process described above, and the information of whether the wireless LAN environment can stably perform playback is accumulated in the playback wireless LAN information manager 34*a* for each access point connected to the wireless LAN.

Figure 5:
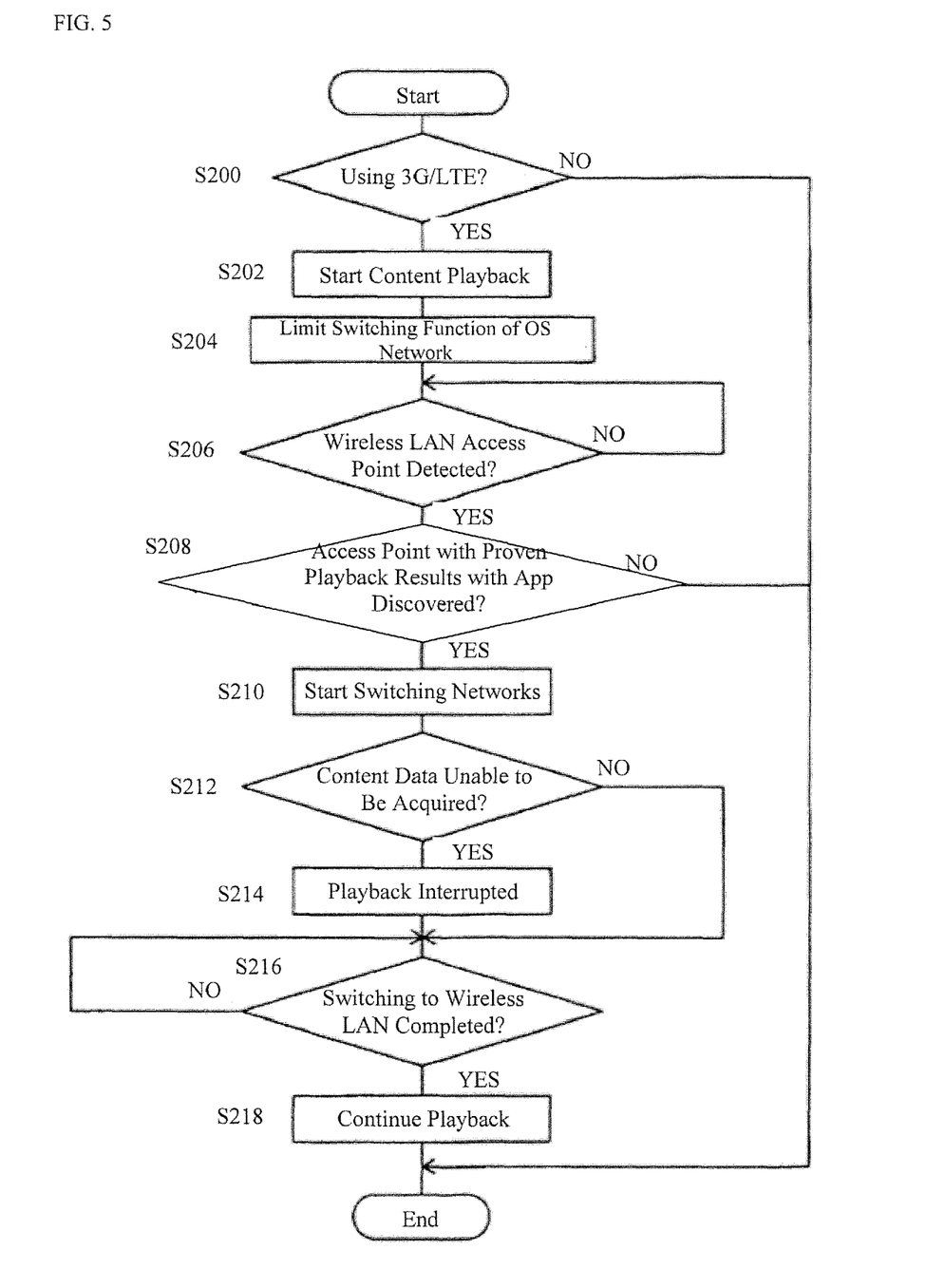
FIG. 5 is a flowchart illustrating a switching procedure from a wireless WAN to a wireless LAN in the case of an access point with proven results according to one or more embodiments of the first example of the present invention.

FIG. 5 is a flowchart illustrating the switching procedure from a wireless WAN to a wireless LAN in the case of an access point with proven results.

The CPU 33*a* of the DMP 32 according to one or more embodiments of the present invention determines whether 3G/LTE is being used in step S200, starts playback of content in step S202, and at this time, limits the network switching function of the OS in step S204. The 3G/LTE is a type of wireless WAN environment. Normally, the mobile information terminal, when connected to a network in a wireless WAN environment using the function of the OS 33*m*, tries to connect and switch to a wireless LAN environment if a connectable wireless LAN environment is discovered. In contrast, in step S204, switching as such is prohibited. The prohibition of switching is implemented by setting a predetermined parameter for the network manager 33*j*.

Thereafter, playback of the content is continued, and the CPU determines whether a wireless LAN access point was detected by the function of the OS 33*m* in step S206. The OS 33*m* monitors whether a wireless LAN environment is in the vicinity at predetermined time intervals using the wireless LAN communication unit 33*g*. The CPU may acquire the monitoring results in step S206. The determination in step S206 corresponds to the detector for detecting when able to connect to another wireless LAN while connected to a wireless WAN or while connected to a wireless LAN.

Also, when a wireless LAN access point is detected, the CPU 33*a* acquires the SSID, and in step S208, determines if an access point with proven playback results has been discovered with the application. Since the access point of a wireless LAN that can stably play back content is registered by SSID in the playback wireless LAN information manager 34*a*, the CPU may determine whether the newly discovered SSID matches with an SSID registered in the playback wireless LAN information manager 34*a*.

If the SSID of the wireless LAN access point detected in step S206 is not registered in the playback wireless LAN information manager 34*a*, it is not an access point with a proven playback results in an app. However, if the SSID of the wireless LAN access point detected in step S206 is registered in the playback wireless LAN information manager 34a, it is an access point with a proven playback results in the app, and the prohibition of switching from wireless WAN to the wireless LAN is released. Specifically, the CPU 33a starts the switching of the network in step S210. That is, the process of step S206 through S210 stands-by for the condition for releasing the switching prohibition to be fulfilled, that is, when an access point with a proven playback results has been discovered by the app, and since once the switching prohibition release condition has been met the prohibition of switching to the wireless LAN is released, when a predetermined second condition is met while receiving the content, is applied to a controller for switching to the access point of the detected wireless LAN. In one or more embodiments of the first example of the present invention, a determination for prohibiting, standing-by, and releasing is carried out, but this does not mean it needs to be an individual process; a substantially similar process may be carried out by a series of determinations and processes. In addition, in one or more embodiments of the first example of the present invention, the wireless WAN (mobile communication network) is an example of a first network and the wireless LAN is an example of a second network, but it is not limited to these.

In one or more embodiments of the first example of the present invention, playback can possibly be interrupted during switching. In step S212, when falling into a condition in which content data is not able to be acquired, even during content playback, in step S214, playback is interrupted. In that case, in step S216, the CPU stands-by for the determination of whether the switching to the wireless LAN is completed, and continues playback in step S218. When playback is not interrupted, the process following step S212 does not occur.

In one or more embodiments of the first example, the content is not easily interrupted when switching from a wireless WAN to a wireless LAN. However, one or more embodiments of the present invention is also effectively applied when switching from a wireless LAN to a wireless LAN.

In addition, in one or more embodiments of the first example, a content server (external apparatus) is applied by the inside home distribution equipment DMSN 21a and DMSN 21b and the outside home distribution equipment DMST 22 connected to the LAN 11. However, the content server (external apparatus) that can apply one or more embodiments of the present invention is not limited to one connected to the LAN 11; even in a content server connected to the internet 13, one or more embodiments of the present invention can be applied in a similar manner.

Second Example

According to one or more embodiments of the first example of the present invention, an access point with proven playback results is detected, and this is a condition for releasing the switching prohibition. However, if it is an access point with proven playback results, it is not always able to continue playback of content without interruption.

According to one or more embodiments of a second example of the present invention, the process is improved on the assumption that the playback of content is interrupted. As one example, switching from a wireless WAN to a wireless LAN is started when an advertisement is started. This is because when an advertisement is started, even if playback of the content is interrupted, the user does not easily feel any displeasure.

Figure 6:
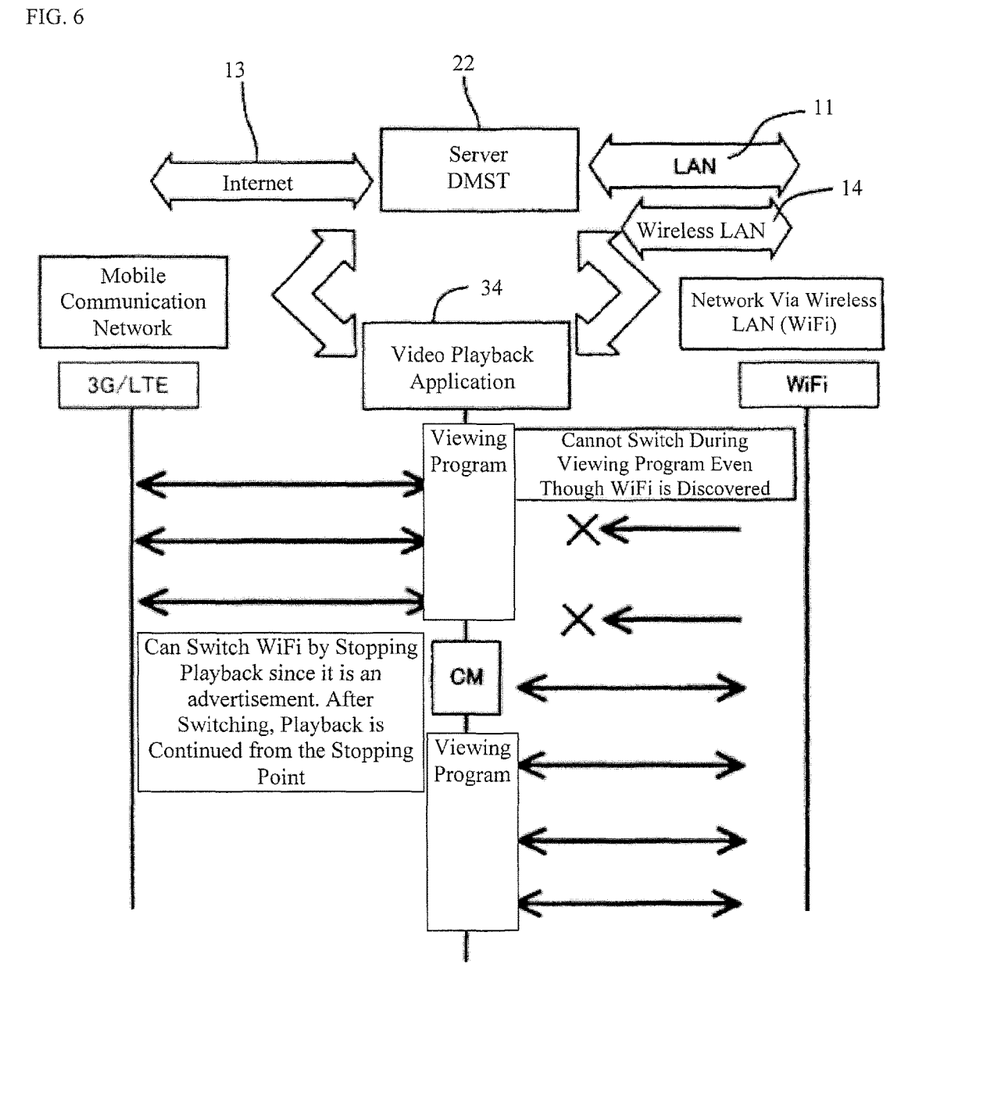
FIG. 6 is an explanatory diagram illustrating a switching procedure from a wireless WAN to a wireless LAN when an advertisement has started according to one or more embodiments of a second example of the present invention.

FIG. 6 is an explanatory diagram illustrating a switching procedure from a wireless WAN to a wireless LAN when an advertisement has started according to one or more embodiments of the second example of the present invention.

The video playback application 34 executed by the DMP 32 receives a distribution of content from the content server (DMST 22) of the home itself using a mobile radio wave network (wireless WAN), such as 3G/LTE, or a wireless LAN from outside the home itself. The network used at this time is the internet 13, the LAN 11 of the home network, or the wireless LAN 14 from outside the home itself and the like.

First, the video playback application 34 views the content program via the mobile communication network. Midway, a wireless LAN (WiFi) is detected. However, since the program is being viewed, even if a WiFi is detected, it is not allowed to switch. Then, when detecting the start of an advertisement by determining the nature of the content, since it is an advertisement, it switches to WiFi. At this time, it switches to WiFi once playback has been stopped, and playback may be continued from the point at which it stopped after switching. When playback is actually stopped at the start of an advertisement, thereafter there is an advantage in that an unstable condition in which it is not understood whether the playback is interrupted does not occur. The user feels that this way may be clearer in some cases, and for users who prefer this way to be as uninterrupted as possible, playback may not be stopped, and instead be continued during the start of an advertisement.

Figure 7:
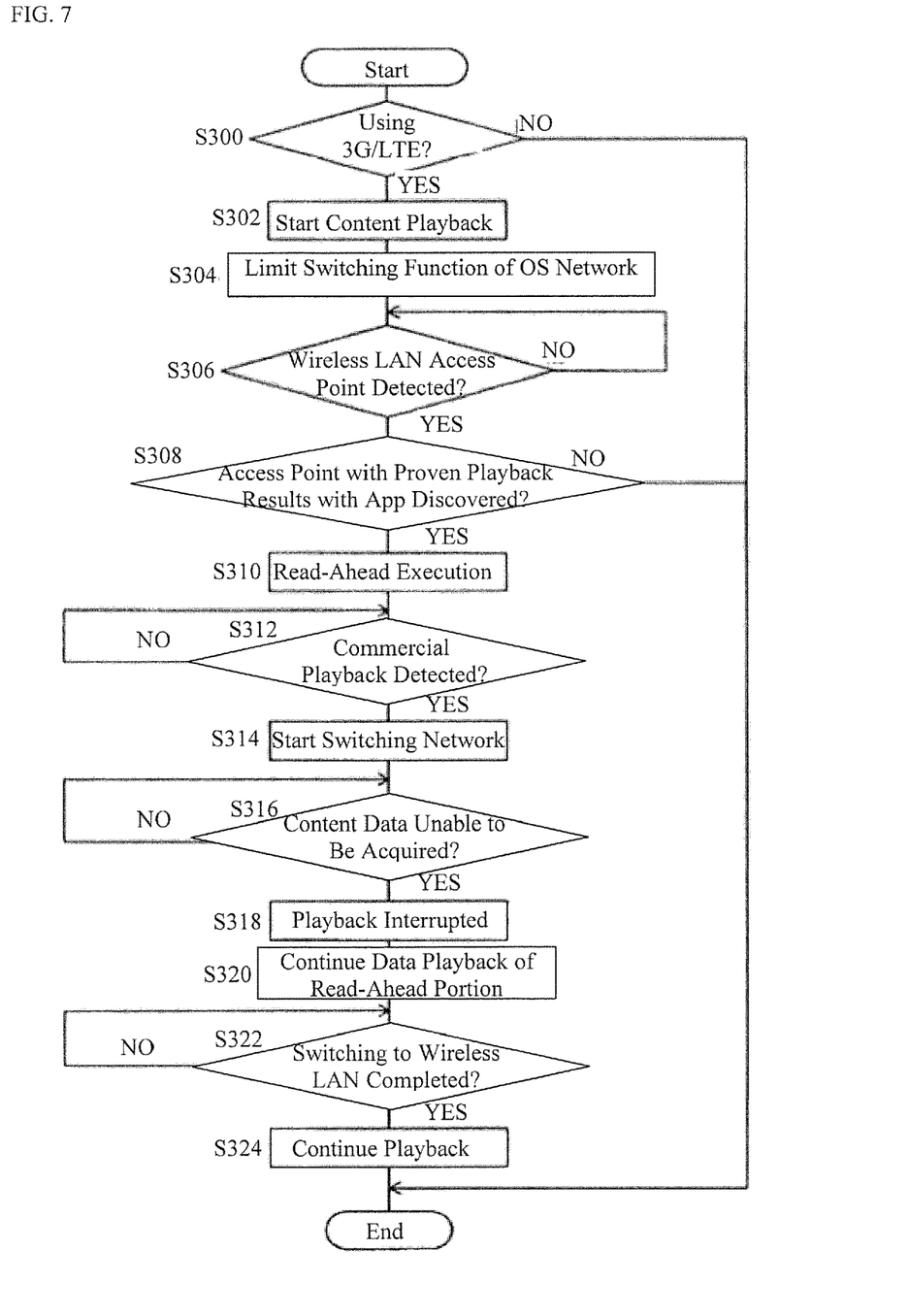
FIG. 7 is a flowchart illustrating the switching procedure from a wireless WAN to a wireless LAN when an advertisement has started according to one or more embodiments of the second example of the present invention.

FIG. 7 is a flowchart illustrating a switching procedure from a wireless WAN to a wireless LAN when an advertisement has started according to one or more embodiments of the second example of the present invention.

The CPU 33a executes the following process if using a 3G/LTE wireless WAN environment in step S300. First, the CPU 33a, once starting content playback in step S302, does a process similar to that of step S204, and in step S304, limits the network switching function of the OS 33m. In addition, the CPU 33a, when detecting a wireless LAN access point in S306, determines whether an access point with a proven playback results was discovered by the app in S308. These are similar to step S206 and S208.

However, according to one or more embodiments of the second example of the present invention, the CPU 33a carries out a read-ahead execution in step S310. The read-ahead execution is a process for increasing the region of the read-ahead buffer size, and if the instructed read-ahead buffer size is increased, a further future portion of content data is requested from the outside home distribution equipment DMST 22 that is the content server. As the content data is read-ahead, even if the distribution of content data is interrupted for some reason, since the playback may process the content data that was read ahead, in reality, playback is not interrupted over a long period of time.

On the other hand, the CPU 33a, once starting content playback, determines the content being currently played back using the viewing content determination app 34b. Specifically, it understands when transitioning between the main part of the content, an advertisement, an opening, or the title. Also, by obtaining a determination of the viewing content determination app 34b, it determines that the playback of an advertisement was detected in step S312, and starts switching of the network in step S314. Since the switching is started, the timing of an advertisement during the content meets the predetermined second condition.

Note that, similar to how the timing of starting an advertisement playback starting can be said to be timing in which it is acceptable to the user for playback to be interrupted, it can be said that the timing in which the content title is changed is a timing in which it is acceptable to the user for playback to be interrupted. Since the content title is also determined by the viewing content determination app 34b, the CPU 33a, instead of detecting playback of an advertisement in step S312, once a title change is detected, may start switching networks in step S314. Since the switching is started, the timing of changing the title meets the predetermined second condition.

According to one or more embodiments of the second example of the present invention, before detecting playback of an advertisement, an execution of reading-ahead is started in step S310, but execution of reading-ahead may also be started once playback of an advertisement has started. In addition, the process of step S310 applies to a process for increasing the buffering (reading-ahead) of data received by the communication unit while standing-by until the condition for releasing the switching prohibition is met.

After starting switching, in a condition in which content data cannot be acquired in step S316, playback is interrupted in step S318, but data playback of the read-ahead portion may be continued immediately in step S320. Also, once switching to a wireless LAN is completed in step S322, playback is continued in that state in step S324.

Third Example

According to one or more embodiments of a third example of the present invention, As for a timing in which there is no problem even when content playback is interrupted, when the user operates to interrupt content playback, networks may be switched.

Figure 8:
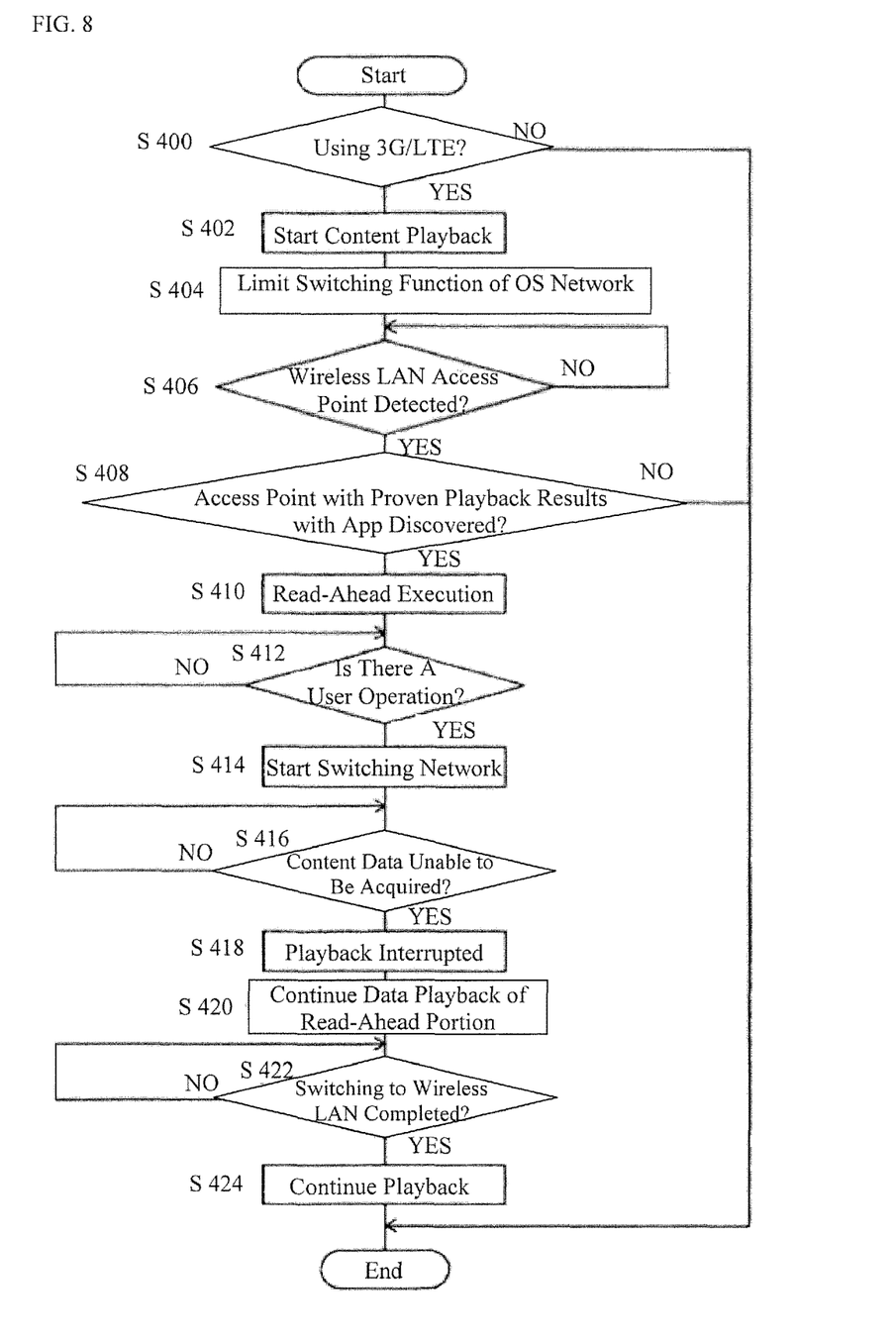
FIG. 8 is a flowchart illustrating a switching procedure from a wireless WAN to a wireless LAN when a user has performed an operation according to one or more embodiments of a third example of the present invention.

FIG. 8 is a flowchart illustrating the switching procedure from a wireless WAN to a wireless LAN when a user performs an operation according to one or more embodiments of a third example of the present invention.

The process of step S400 through S410 is similar to the process of step S300 through S310, and a description thereof is omitted here.

The CPU 33a, after carrying out an execution of reading-ahead in step S410, determines whether there is an operation from the user in step S412. The presence of an operation from the user can be acquired via the application UI 34c. During content playback, the operation of "playback" is an operation carried out at the end. When the user touches the touch panel 33d, the application UI 34c acquires position information for which portion of the touch panel 33d was touched, and the process corresponding to the operation of the application UI 34c disposed in that position is executed.

On the other hand, the CPU 33a can detect the operation of the user via the application UI 34c in step S412. If this operation is something other than playback, the user can determine that the content playback has been temporarily interrupted by him/herself. At this time, since the user wants something other than continuous viewing of the content, even though the distribution of content is interrupted, it is expected that no displeasure is felt. Thus the CPU 33a starts switching networks in step S414. Since switching is started, the timing of the operation from the user meets the predetermined second condition.

Since the process of the following steps S416 through S424 is similar to the process of step S316 through S324, a description thereof will be omitted.

Fourth Example

Figure 9:
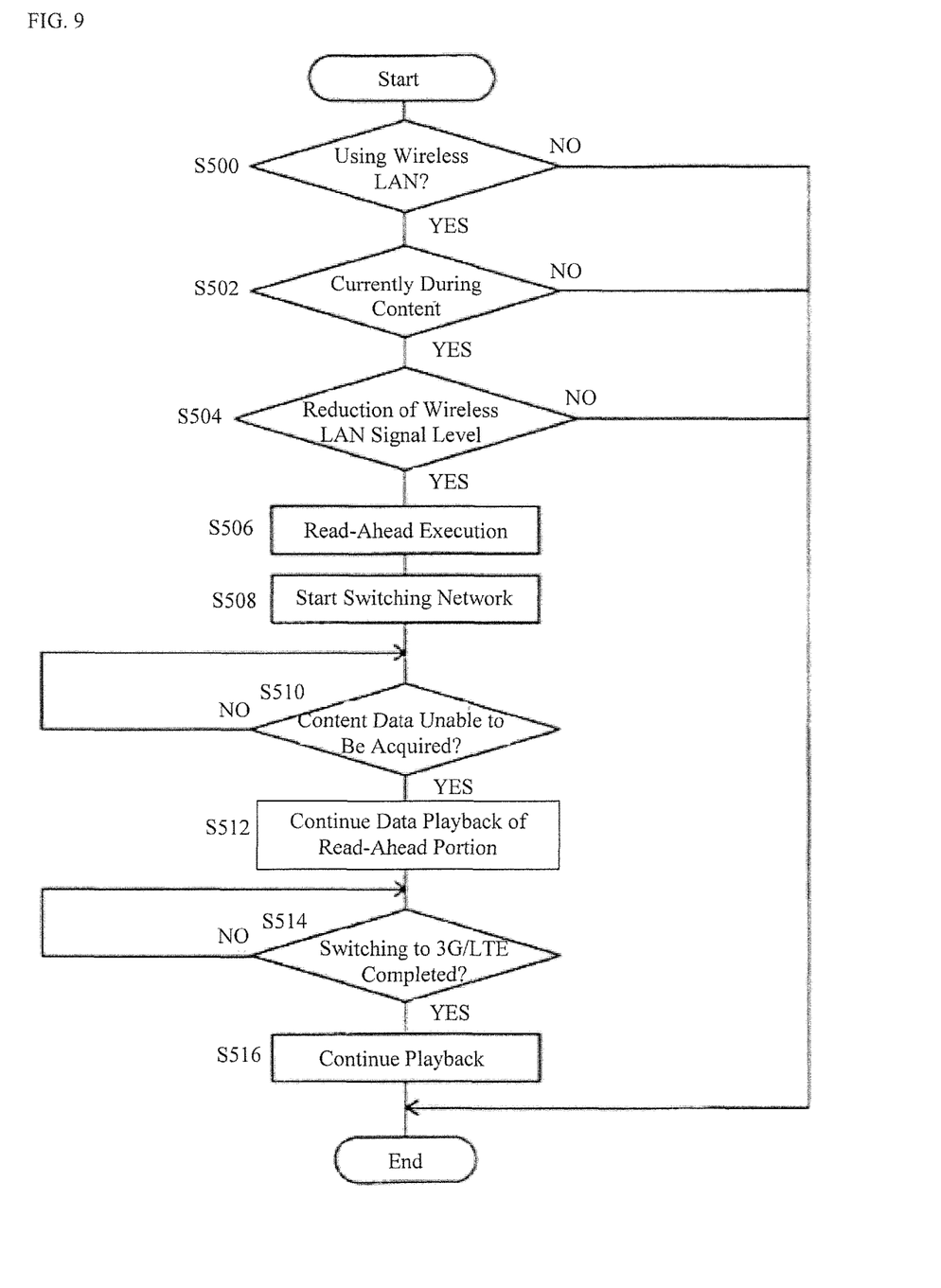
FIG. 9 is a flowchart illustrating a switching procedure from a wireless LAN to a wireless WAN according to one or more embodiments of a fourth example of the present invention.

FIG. 9 is a flowchart illustrating the switching procedure from a wireless LAN to a wireless WAN according to one or more embodiments of a fourth example of the present invention.

According to one or more embodiments of the fourth example of the present invention, content playback is not easily interrupted when moving out of range of a wireless LAN when playing back content in a wireless LAN environment.

The CPU 33a determines that a wireless LAN is being used in step S500, and once determined that the content is being played back in step S502, the following process is executed. First, the CPU 33a determines if a reduction of wireless LAN signal level has been detected in step S504. The wireless LAN signal level detects when the wireless LAN communication unit 33g is in communication with the access point of the wireless LAN, and that information is managed by the wireless LAN information manager 33h. Therefore, the CPU 33a accesses the wireless LAN information manager 33h, and acquires the value of the signal level at that time. The CPU 33a, by repeating this access, sequentially determines if the wireless LAN signal level is gradually reducing. Since the strength of the wireless LAN signal varies due to various factors in the surroundings, the CPU 33a, while calculating the average value for a predetermined period, determines whether the average value is gradually reducing.

Also, when it is determined that it has been detected that the wireless LAN signal level is reducing in step S504, the CPU 33a carries out an execution of reading-ahead in step S506. By carrying out an execution of reading-ahead, the reading-ahead buffering region increases, a large quantity of content data can be read ahead and temporarily stored from the outside home distribution equipment DMST 22 that is the content server.

Thereafter, the CPU 33a starts switching networks in step S508. After starting switching, when in a condition in which content data cannot be acquired in step S510, although playback is interrupted originally, since the read-ahead portion of the playback data is continued immediately in step S512, playback is not easily interrupted. Also, once switching to 3G/LTE is completed in step S514, playback is continued in that state in step S516. Thereby, even when moving out of range of a wireless LAN while playing back content in a wireless LAN environment, content playback is not easily interrupted.

The wireless LAN information manager 33h is accessed in step S504, the process for detecting if the signal level is gradually decreasing is applied to the signal strength detector for detecting the signal strength of the wireless LAN while connected to a wireless LAN, the process for carrying out the execution of reading-ahead in step S506 is applied to the process for increasing the buffer size of data received by the communication unit when a reduction of signal strength of the wireless LAN is detected using a signal strength detector. According to one or more embodiments of the fourth example of the present invention, although the buffer size of data is increased in accordance with decrease of signal strength, it is not limited to decrease of signal strength, but the buffer size of data may be increased based on a change in signal strength. For example, since it is unstable when the change of received signals is large, the buffer size can be increased.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims. Furthermore, one of ordinary skill would appreciate that the various components described herein with reference numbers may be implemented by an electronic circuit or other electronic devices.

EXPLANATION OF REFERENCES

11 LAN
12 Router
13 Internet
14 Wireless LAN
21a Inside Home Distribution Equipment DMSN
21b Inside Home Distribution Equipment DMSN
22 Outside Home Distribution Equipment DMST
31 Activation Server
32 Digital Media Player (DMP)
33 Information Terminal Basic Function
33a CPU
33b Flash ROM
33c RAM
33d Touch Panel
33e Display Device
33f 3G/LTE Communication Unit
33g Wireless LAN Communication Unit
33h Wireless LAN Information Manager
33j Network Manager
33k Video Playback Function
33m OS
34 Video Playback Application
34a Playback Wireless LAN Information Manager
34b Viewing content Determination Application (or Determination Circuit)
34c Application UI
34d Playback Control Processing Portion
40 DMS
41 Tuner
42 Hard Disk Drive
43 Network Interface
44 Controller
44a Decoder
44b Encoder
44c Display Controller
44d CDS Manager
44e Outside Home Distributor
44f Inside Home Distributor
45 Display
46 Remote Controller

What is claimed is:

1. A content receiving apparatus that connects to a first network and one or more access points of a second network, comprising:
a communication unit that receives a first content distributed from an external apparatus via the first network;
a memory that stores a first access point of the second network that meets a predetermined first condition;
a detector that detects a first access point connectable to the content receiving apparatus of the second network in the memory;
a playback control manager that maintains playback information from a video playback application on the content receiving apparatus; and
a controller that automatically changes a connection from the first network to the detected first access point based on determining that a predetermined second condition is met while the first content is being played based on the playback information,
wherein the predetermined first condition is that a second content was previously played using the video playback application without interruption over a predetermined period.

2. The content receiving apparatus according to claim 1, wherein when the second content received using the first access point have been played, the controller changes the connection to the first access point.

3. The content receiving apparatus according to claim 1, wherein when the second content received using the first access point have not been played, the controller prohibits changing the connection to the first access point.

4. The content receiving apparatus according to claim 1, wherein the controller increases a buffer size of data received by the communication unit until the predetermined second condition has been met.

5. The content receiving apparatus according to claim 4, wherein the controller requests the external apparatus to distribute a future portion of content data of a content after the content data has been played.

6. The content receiving apparatus according to claim 4, wherein the controller increases the buffer size before the controller changes the connection to the first access point.

7. The content receiving apparatus according to claim 4, wherein the controller increases the buffer size when an advertisement within the first content begins to play.

8. The content receiving apparatus according to claim 1, wherein the predetermined second condition is that an advertisement within the first content begins to play.

9. The content receiving apparatus according to claim 1, wherein the predetermined second condition is that a predetermined user operation of the content receiving apparatus is carried out.

10. The content receiving apparatus according to claim 9, wherein the predetermined user operation is an operation other than a playback operation.

11. The content receiving apparatus according to claim 10, wherein the operation other than a playback operation is an operation that interrupts a playback of the first content.

12. The content receiving apparatus according to claim 1, wherein the predetermined second condition is that the controller detects that a title of the first content has changed.

13. The content receiving apparatus according to claim 1, further comprising:
a signal strength detector that detects signal strength when the communication unit connects to the second network, wherein
the controller increases a buffer size of data received by the communication unit based on the detected signal strength.

14. The content receiving apparatus according to claim 13, wherein the controller increases the buffer size when the signal strength detector detects that the signal strength decreases.

15. The content receiving apparatus according to claim 13, wherein the controller increases the buffer size when the signal strength detector detects that an average value of the signal strength decreases in a certain period.

16. The content receiving apparatus according to claim 1, wherein
the first network is a mobile communication network, and the second network is a wireless LAN.

17. A method for changing a connection of a content receiving apparatus that connects to a first network and one or more access points of a second network, the method comprising:
- receiving, with a communication unit of the content receiving apparatus, a first content distributed from an external apparatus via the first network;
- storing, with a memory of a content receiving apparatus, a first access point of the second network that meets a predetermined first condition;
- detecting, with a detector of the content receiving apparatus, a first access point connectable to the content receiving apparatus of the second network in the memory;
- maintaining, with a playback control manager, playback information from a video playback application on the content receiving apparatus; and
- automatically changing, with a controller of the content receiving apparatus, the connection from the first network to the detected first access point based on determining that a predetermined second condition is met while the first content is being played,
- wherein the predetermined first condition is that a second content was previously played using the video playback application without interruption over a predetermined period.

18. The method according to claim 17, wherein the predetermined second condition is that an advertisement within the first content begins to play.

* * * * *